United States Patent [19]

Vander Togt

[11] Patent Number: 4,999,227
[45] Date of Patent: Mar. 12, 1991

[54] BUMPER AND PROCESS TO BOND IONOMERS TO PLASTIC

[76] Inventor: Robbert T. Vander Togt, 75B Buffalo Street, Brantford, Ontario, Canada, N3R 1E1

[21] Appl. No.: 519,865

[22] Filed: May 7, 1990

[51] Int. Cl.$^5$ ............................................. B32B 3/26
[52] U.S. Cl. .................................. 428/31; 264/45.1; 428/71; 428/319.1; 428/319.7
[58] Field of Search ............ 264/45.1; 428/31, 71, 428/319.7, 319.1

[56] References Cited
U.S. PATENT DOCUMENTS
4,569,865 2/1986 Placek .................................. 428/31

Primary Examiner—William J. Van Balen
Attorney, Agent, or Firm—Riches, McKenzie & Herbert

[57] ABSTRACT

An automotive bumper is disclosed which comprises a shell of injection molded platable grade ABS plastic. The plastic shell is plated with chromium metal and then backfilled by injection of ethylene ionomers. The resultant composite product provides an article which has a metallic appearing external surface and is backfilled with a strong, resilient plastic core. The composite structure has a pleasing appearance, is lightweight and is easy to manufacture. It has substantial structural integrity necessary to serve as impact resistant members on automobiles. The invention also provides a novel process to bond ethylene ionomers to plastic articles of metal-platable grade plastic resin.

18 Claims, 4 Drawing Sheets

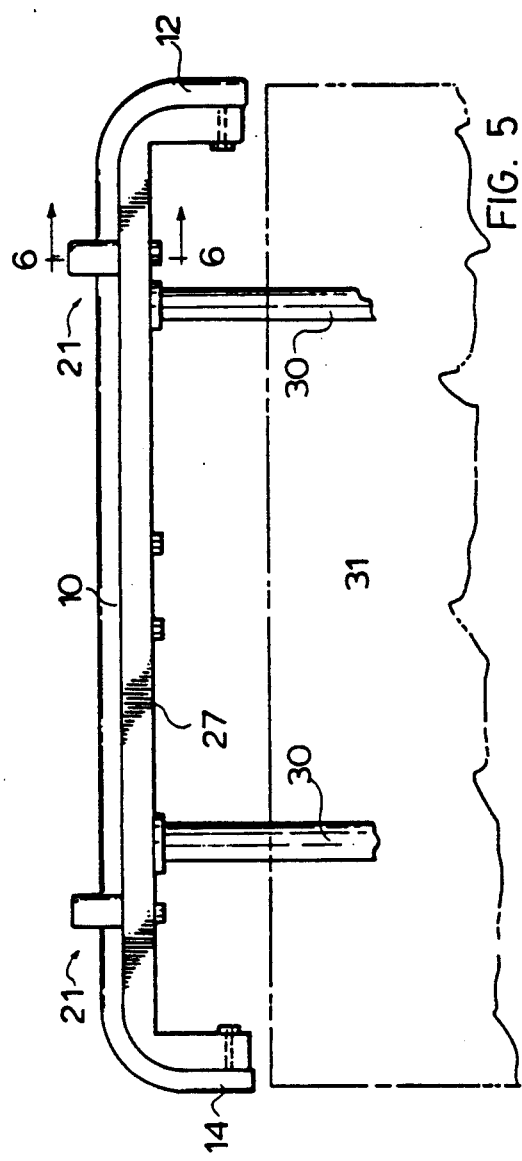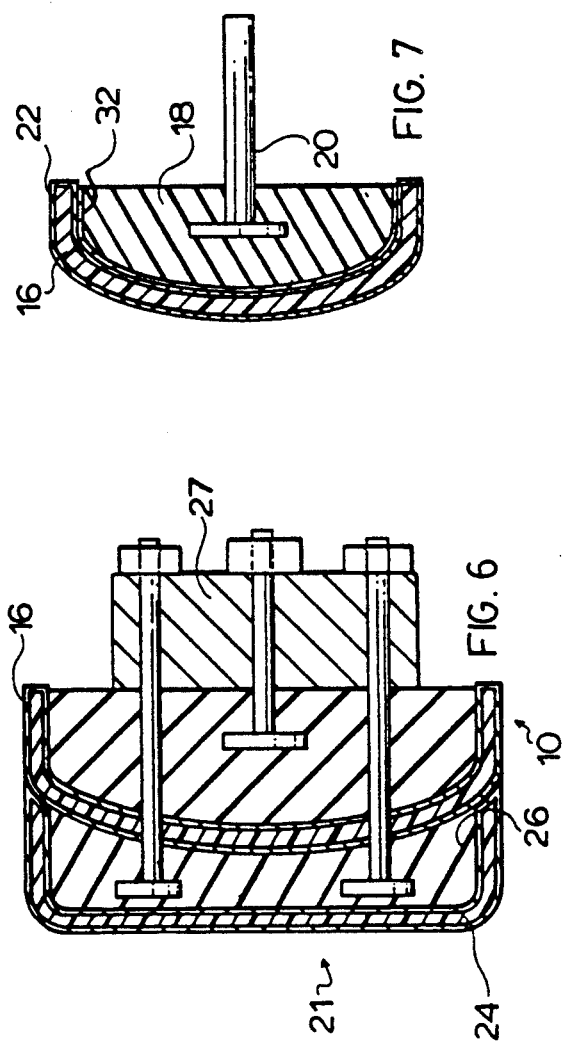

BUMPER AND PROCESS TO BOND IONOMERS TO PLASTIC

SCOPE OF THE INVENTION

This invention relates to a composite plastic article and, more particularly, to ionomer backfilled chrome plated plastic articles, particularly suitable for automotive bumpers, bumper guards and side moldings.

BACKGROUND OF THE INVENTION

Composite metal backfilled automotive bumpers are known. For example, U.S. Pat. No. 4,569,865 teaches a thin stainless steel outer shell which is chrome plated and then backfilled with ethylene ionomers. Such composite metal and plastic bumpers have the disadvantage that the metal shell is relatively heavy, is difficult to stamp and requires extensive tooling for the stamping. The use of a metal shell has inherent design limitations and is expensive. The extensive tooling further makes it expensive and time consuming to make changes in individual components.

Previously known bumper parts do not provide a lightweight bumper which has an exterior appearance of bright metal yet are sufficiently strong to meet normal bumper impact and strength requirements.

SUMMARY OF THE INVENTION

Accordingly, it is an object of the present invention to provide a decorative bumper having bright, metallic appearing external surfaces supported on a plastic shell and backfilled with a resilient plastic core.

Another object is to provide a method of bonding ionomers to plastic articles of metal-platable plastic resin.

Another object is to provide a composite article comprising an injection molded shell of metal-platable grade plastic having a layer of metal plated to its surfaces and a core of foamed ethylene ionomer injected molded thereto.

Accordingly, in one of its aspects, the present invention provides a method of bonding ethylene ionomer to a metal-platable plastic comprising:

plating a surface of the plastic with metal, and injection molding the ionomer onto the plated surface.

In another aspect, the present invention provides a decorative, structural automotive bumper comprising:

a shell of metal-platable grade plastic resin, said shell having exterior surfaces and interior surfaces, said exterior and interior surfaces plated with a decorative layer of metal, a core of substantially rigid but resilient foamed ethylene ionomer bonded to the interior surfaces, wherein said bumper is made by a process comprising:

plating said exterior and interior surfaces with said metal layer and then foam injection molding the core to the metal layer over the interior surfaces.

In accordance with the present invention an article or shell is formed to have surfaces of metal-platable plastic. The shell may be formed by any process as, for example, advantageously by injection molding to a desired shape. Subsequently, the plastic shell is then plated with metal. An ethylene ionomer is next injection molded onto the plated surface. By this method, a composite article is formed with the plastic shell strongly bonded to the injection molded ethylene ionomer by bonds developed through the metal plating layer.

The plastic shell comprises a metal-platable grade of plastic resin. Such a resin is one which can be plated with metal and retains the metal plating securely forming a strong bond therewith. One example of such a resin is ABS platable grade resin supplied by G. E. Plastics Canada under the trade name Cycolac ABS-Gray-EP 3510. While normal ABS can be plated and is suitable, better adhesion of the metal plating is developed with platable grade ABS resins.

The plastic shell may comprise ABS alone or mixtures of ABS with other components such as polycarbonate plastic to provide enhanced strength and other properties. Other plastics such as NORYL plastic, a trademarked product of General Electric may be used.

When a composite article of the present invention is desired to be used as an automotive bumper, then the metal-platable grade plastic resin for formation of the plastic shell preferably is to be selected to not only be electroplatable but also to have high impact properties under varying temperatures and conditions.

A metal layer is to be plated onto the plastic shell to form a thin layer of metal on surfaces of the plastic shell. A preferred metal plating process is the same as that used for conventional chrome plating techniques of plastic. Such plastic plating processes are known, particularly for plating of ABS plastics. One company which specializes in such plating process is Leader Plating of Toronto, Ontario, Canada. Shipley Company Inc. of Newton, Mass., U.S.A. provides a complete system and line of components for the known bath steps of etching, neutralizing and plating in the conventional multi-bath electrolytic plating processes. Other plating methods such as vacuum deposition may also be suitable.

Many metals may be plated onto the plastic article. Preferably, the plating may comprise a composite copper, nickel and chromium layer as, for example, which would meet General Motors' copper, nickel, chrome specification GM 4372M. Other metals such as zinc, lead and tin may also be electroplated as, for example, in acceptable galvanizing processes.

Preferred metals for the plated metal layer include chromium and zinc, both being metals whose surfaces will have advantageous metal oxides to which the ethylene ionomer and/or an optional primer layer such as ethylene acrylic acid co-polymer may securely bond.

The plated plastic shell or article is then placed in a mold cavity and ionomer injection molded into the cavity so as to contact at least portions of the plated surfaces. Preferred ionomers are ethylene ionomers and, particularly, zinc and sodium base ionomers such as sold under the SURLYN trade mark of E. I. DuPont Company Ltd.

As an optional step, after plating the plastic shell and before injection molding with the ionomer, surfaces of the plated shell may be pretreated by applying a primer layer to increase the bond strength of the ionomer to the metal. One preferred primer layer comprises ethylene acrylic acid co-polymer. Co-polymers which may be used as a primer layer include Dow EAA-Dispersions. Such preferred co-polymers comprise polyethylene base polymers with substantially unneutralized carboxylic acid end groups having a melt index in the range of 300 to 1300. Preferably, these co-polymers have molecular weights in the range of 10,000 to 25,000 with molecular weights in the upper end of this range and even greater than 25,000 believed preferred to maximize inter-molecular forces between long chain co-polymers and ionomers. A dispersion of ethylene acrylic acid co-polymer in a suitable solvent may be sprayed onto plated surfaces of the plastic shell and then allowed to dry at either air temperature or under heating as, for example, at about 160° F. Another example of a pretreatment solution is Blue-Michem Prime 4983 available from Michelman Inc. of Cincinnati, Ohio.

With the process of the present invention, the plastic shell or article may be plated with the metal, preferably chrome plated so as to provide a pleasing decorative layer of chrome metal on exterior surfaces of the plastic shell. The plated plastic shell may then be placed in a mold so that ethylene ionomer to be injected contacts merely interior or rear surfaces of the plastic shell when injected into the mold and thus forms a structural core to support the shell. On removal from the mold, the resulting composite article has as a decorative exterior surface the metallic chrome surfaces of the plastic shell and has a strong and resilient backfilled core of ethylene ionomer.

BRIEF DESCRIPTION OF THE DRAWINGS

Further aspects and advantages of the present invention will appear from the following description taken together with the accompanying drawings in which:

FIG. 5 comprises a schematic top elevation view of a bumper fascia of FIG. 1 and a bumper guard of FIG. 2 as included in an assembled bumper coupled to one end of an automotive frame;

FIG. 6 comprises a cross-sectional view through the assembled bumper of FIG. 5 along 6—6';

FIG. 7 comprises a cross-sectional view of a bumper fascia similar to FIG. 2 but showing an additional primer layer;

DETAILED DESCRIPTION OF THE DRAWINGS

Figure 1:
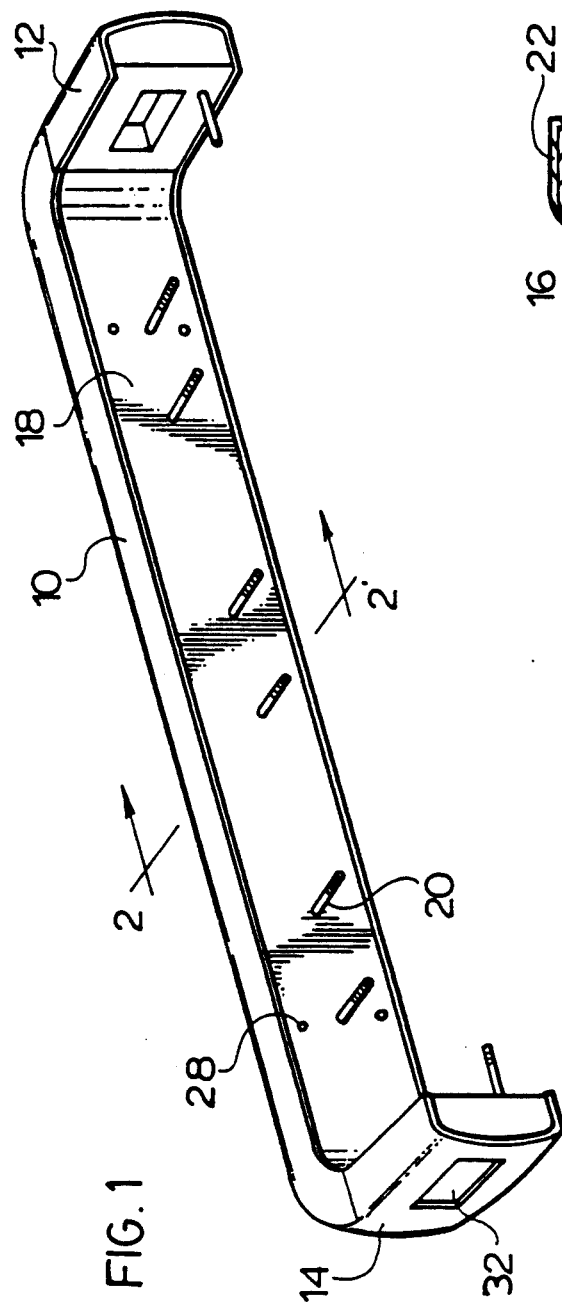
FIG. 1 is a pictorial view of a bumper fascia in accordance with the preferred embodiment of the present invention.
Figure 2:
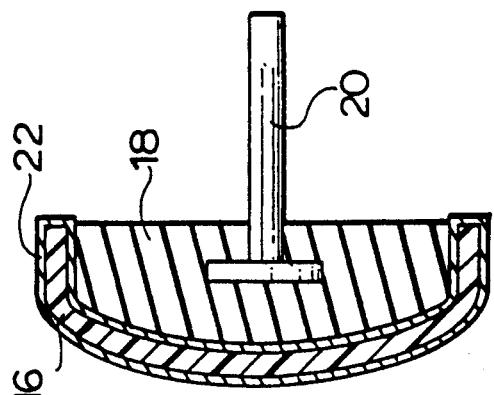
FIG. 2 comprises a cross-sectional view through the bumper fascia of FIG. 1 along section line 2—2'.

Reference is made first to FIGS. 1 and 2 which show a bumper fascia in accordance with the present invention.

In FIG. 1, the bumper fascia is shown as three segments being center segment 10 and corner or end segments 12 and 14. Alternatively, the bumper fascia could comprise a single unitary element. In cross-section, each bumper fascia segment is similar comprising a C-shape plastic shell 16 and a plastic core generally indicated as 18. As best seen in FIG. 2, the plastic shell 16 is plated with a thin layer of metal generally indicated 22 over all the surfaces of the shell. For illustration, plated metal layer 22 is shown in enlarged relative thickness in the figures compared to the size it would normally actually represent.

Plastic core 18 is bonded, in FIG. 2, directly to the plated metal layer 22 over the inside surfaces of plastic shell 16. Bolts 20 are provided to fasten the bumper fascia to other portions of the bumper and bolts 20 are shown impregnated within plastic core 18. Other fastening devices such as T-nuts may be substituted for the bolts and preferably impregnated in the core.

Figure 4:
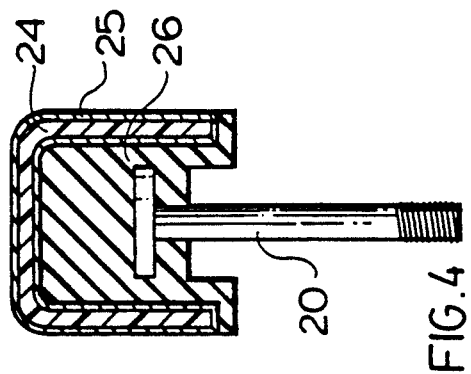
FIG. 4 is a cross-sectional view through the bumper guard of FIG. 3 along section line IV—IV'.
Figure 3:
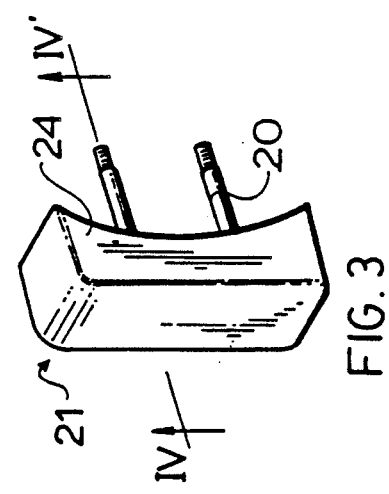
FIG. 3 shows a pictorial view of a bumper guard in accordance with the preferred embodiment of this invention.

FIGS. 3 and 4 show a bumper guard 21 in accordance with the present invention. As seen in FIG. 3, the plastic shell is generally indicated 24. As better seen in FIG. 4, the plastic shell 24 is seen to carry a layer of plated metal 25 over the entirety of its surfaces. A plastic core or backing generally designated 26 is bonded directly to inside surfaces of plated metal layer 22 on the inside surfaces of the plastic shell 24. Securing bolts 20 are impregnated within plastic backing 26.

FIGS. 5 and 6 show the bumper fascia of FIG. 1 and the bumper guard of FIG. 3 in an assembled bumper. Bumper plate 27 is of a material such as metal or fibreglass of sufficient strength to withstand forces on low speed collisions of an automobile. Bumper fascia sections 10, 12 and 14 are mounted via bolts 20 to bumper plate 27. Bumper guards 21 are mounted over bumper fascia 10 with bolts 20 to pass through holes 28 in the bumper fascia to permit coupling to the bumper plate 27. Bumper plate 27 is coupled to two extensions 30 by means not shown. The extensions 30 are coupled to an automotive frame 31 by conventional means (not shown) such as shock-absorbing columns to absorb forces of low speed automotive collisions. Suitable openings 32 in bumper fascia segments 12 and 14 as seen in FIG. 1 may be provided to receive side lights.

As is to be appreciated in the drawings, bumper fascia 10, 12 and 14 and bumper guards 21 are provided with a decorative exterior surface, namely, the plated layer of metal 22 on the exterior surfaces of the plastic shell 16 exposed so as to provide an advantageous visual appearance.

The plastic shell 16 as shown in the drawings advantageously may be chosen to have an open-ended C-shape or U-shape cross-section. This facilitates injection of the core into the rear of the shells. The resiliency of the shell assists in forming a viable seal when the shell is to be placed into the mold. The mold may preferably be designed to flex the C-shaped shell inwardly to form a seal.

FIG. 7 shows a cross-sectional view of a bumper fascia identical to that of FIG. 2 with the exception that a primer layer 32 has been applied to the metal layer 22 over inside surfaces of the shell 16 and the core 18 then backfilled to bond to this primer layer 32. While primer layer 32 is shown only in FIG. 7, such a primer layer could be provided with every embodiment illustrated.

Figure 8:
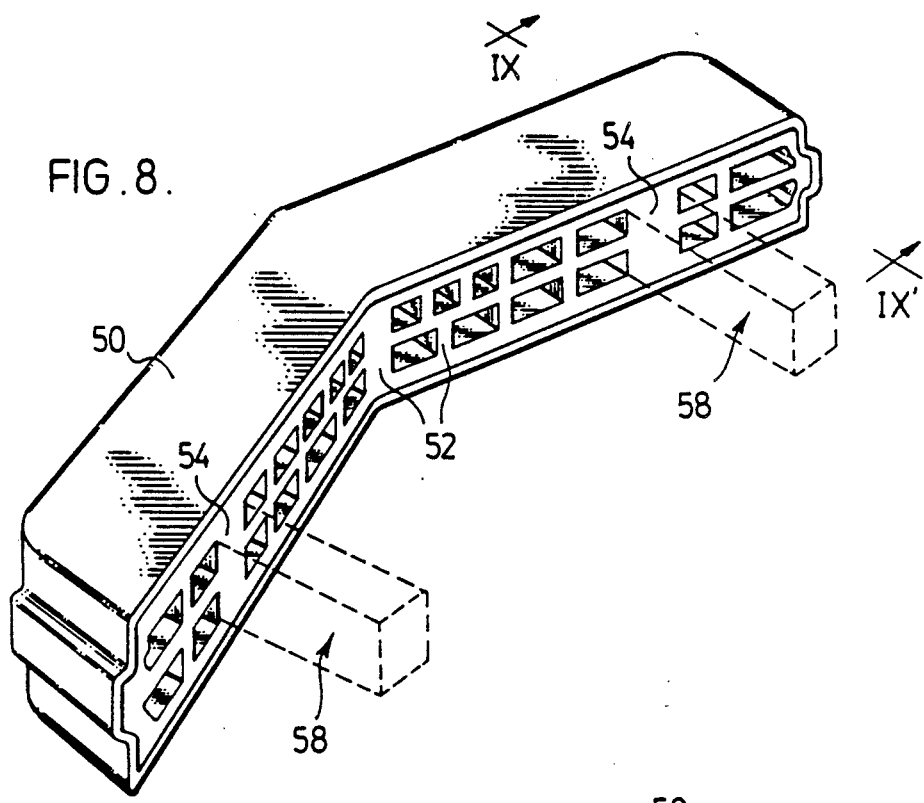
FIG. 8 comprises a pictorial view of an automotive bumper in accordance with another embodiment of the present invention.
Figure 9:
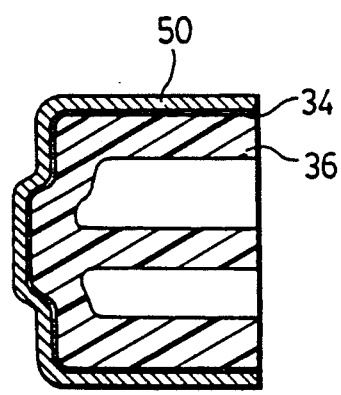
FIG. 9 comprises a cross-sectional view through the bumper of FIG. 8 along section line IX—IX'.

FIG. 8 shows a unitary bumper in accordance with the present invention comprising a unitary injection molded shell 50 of metal-platable plastic resin which has had a layer of metal 34 plated to interior surfaces only of the shell 54 and then a core 36 backfilled to bond to the metal layer 34. In this embodiment, the decorative exterior surface of the shell 54 is to be plastic which may be painted or otherwise treated and the metal layer 34 serves a non-decorative purpose of bonding the shell and core. Of course, all surfaces of the bumper could have been plated. FIG. 8 schematically shows extensions 58 of core 36 for coupling the bumper to a vehicle.

Figure 10:
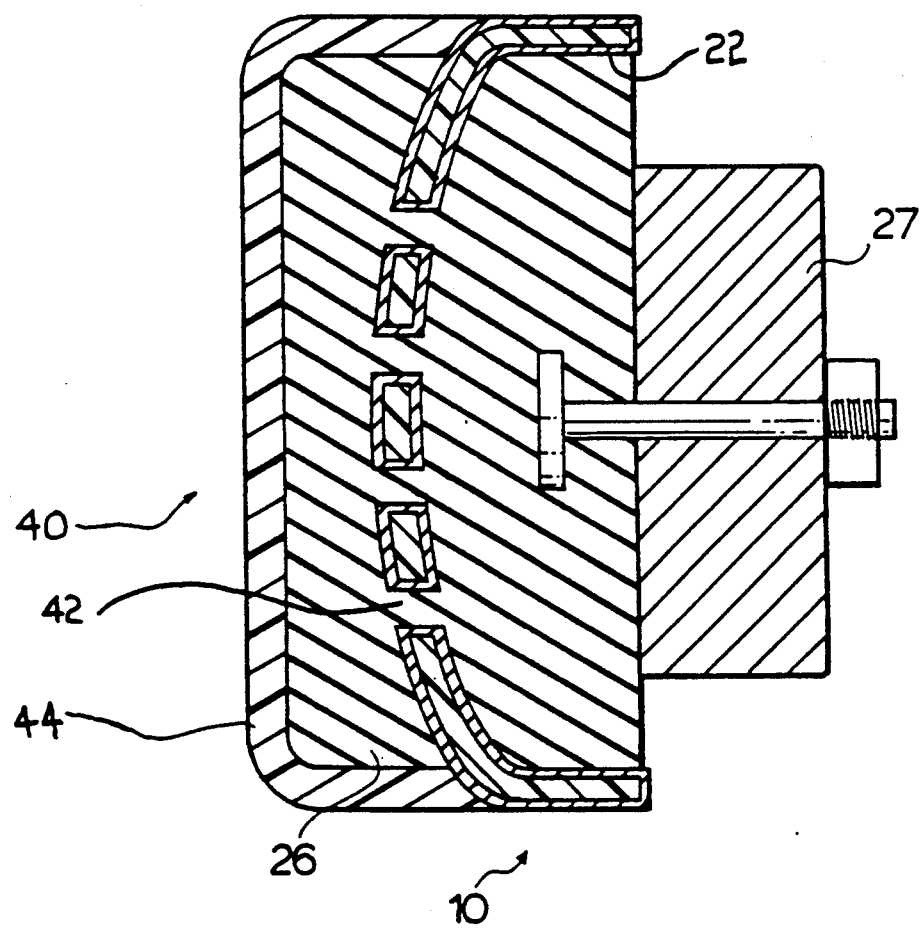
FIG. 10 is a pictorial view similar to that of FIG. 6 but of a bumper with a bumper guard injection molded together simultaneously.

Reference is now made to FIG. 10 showing a cross-sectional view similar to that in FIG. 6 but in which the bumper guard 40 is not mechanically secured to the bumper fascia 10 by bolts but rather by a mechanical bond of the plastic core. As seen in FIG. 10, holes 42 are provided through the plastic shell 16 over locations where the bumper guard 40 is to be applied. The empty shell 44 of the bumper guard 40 is placed with the empty plastic shell 16 into an injection mold, suitably relatively positioned and injection molding is then carried out so that plastic injected for core 18 flows through holes 42 to simultaneously backfill shell 44 of the bumper guard. Plastic shell 16 is shown in FIG. 10 to have been previously coated with a layer of metal 22. In FIG. 10, plastic shell 44 of the bumper guard is shown as an unplated shell of plastic such as previously injection molded SURLYN to which the injected plastic for the core may adhere. Alternately, the bumper guard could be similar to that of FIG. 4. With the construction of FIG. 10, any possible difficulties with the resistance of the plated plastic shells to impact are minimized by reason of providing the bumper guards of a very high impact resistance material, namely, SURLYN. The bumper of FIG. 10 has high impact resistant bumper guards 40 and more decorative bumper fascia 10.

The present invention in its broadest aspect teaches a novel process to bond ionomers to plastic through the use of a layer of metal bonded to the plastic. Resultant composite articles are advantageous in respect of the strength of the bond between the plastic shell and the ionomer core. The resultant strength, resistance to impact, and resiliency can be selected to having regard to the particular nature of the plastic shell and the core. Advantageously, such composite articles may be used as structural members which need to absorb and withstand forces applied thereto. For example, the composite articles may provide bumper fascia or entire bumpers for vehicles and need to be able to absorb low speed impacts with other vehicles or objects without permanent damage. For such bumper uses, the plastic core should be chosen to be of a material which will be sufficiently resilient at low temperatures as may be experienced in areas of extreme weather such as northern Canada or Alaska.

The invention in another aspect provides for all manners of articles which may have enhanced decorative appearance and resistance to damage or marking. For example, in the preferred uses in an automotive bumper, the present invention provides not only for preferred bonding of a plastic shell to an ionomer core, but also provides the very pleasing decorative metal layer on exterior surfaces of the plastic core. The composite article of this invention may therefore be used to make many automotive parts including window trims, headlight bezels, grills, mirror casings and decorative trims such as those which particularly may extend along the exteriors of cars. Similar facings and trims are useful in many types of vehicles including cars, trucks, motorcycles, snowmobiles and boats. Such composite products are useful not only to the automotive industry, but also can provide application wherever a decorative metal exterior is desired in a lightweight damage and corrosion resistant product with a plastic core backing. Examples of such products include hardware for doors and the like including doorknobs, kickplates, metallic-appearing address numbers, appliances, furniture and decorative light fixtures.

In accordance with the present invention, the plastic shell need merely have exterior surfaces which comprise the metal-platable grade plastic resin and it may be possible that such shells may themselves be bonded to or comprise other materials to which the metal-platable plastic resin is but a portion.

The following examples will indicate a preferred manufacture of a decorative bumper part in accordance with the present invention.

EXAMPLE 1

A plastic shell was injection molded at high pressure from cycolac platable ABS-EP 3510 purchased from G. E. Plastics Canada at a temperature of about 450° to 480° F. at injection speeds between about 1 to 25% and injection pressures in the range of 100 to 1300 psi. The resultant plastic shells were then electrolytically plated under a conventional chromium, copper, nickel electrolytic plating process by dipping the plastic parts in successive baths. The parts are plated in accordance with GM copper, nickel, chrome specification GM 4372M. The resultant plated metal layer provided a bright, decorative chrome surface.

The metal plated shell is placed into an injection mold with only interior surfaces of the shell exposed to the injected materials. A core was injection molded into the mold cavity to backfill the shell using as a backfill material compounds marketed by A. Schulman Company as FI-335 which comprises zinc base SURLYN 9520 ionomer, sodium base SURLYN ionomer, glass fibre, carbon black and stabilizer. The injection molding was carried out with the above compounds together with a foaming agent to provide a resultant density of about 0.85 gm/cc$^3$. Sheer adhesion tests conducted on the resultant composite article determined minimum sheer strength between the shell and core in excess of 200 pounds.

EXAMPLE 2

In accordance with a second example, composite articles were formed in a manner identical to that in the first example with the exception that after plating the plastic shell, the plated metal layer on the inside surfaces of the shell were treated with a pretreatment solution comprising Blue-Michem Prime 4983 purchased from Michelman Inc. of Cincinnati, and then passed through a cure oven for approximately four minutes at 160° F. Thereafter, the parts were placed in a mold and backfilled as in the first example. Sheer adhesion tests indicated minimum sheer forces of in excess of 300 pounds between the shell and core.

Although this disclosure describes and illustrates preferred embodiments of the invention, it is to be understood that the invention is not limited to these particular embodiments. Many variations and modifications will now occur to those skilled in the art. For a definition of the invention, reference is made to the appended claims.

The embodiments of the invention in which an exclusive property or privilege is claimed are defined as follows:

1. A method of bonding ethylene ionomer to a metal-platable plastic comprising:
   plating a surface of the plastic with metal, and
   injection molding the ionomer onto the plated surface.

2. A method as claimed in claim 1 wherein said step of plating comprises electrolytic deposition of said metal.

3. A method as claimed in claim 1 wherein said metal is selected from chromium, nickel, copper and mixtures thereof.

4. A method as claimed in claim 3 wherein said plastic comprises ABS platable grade resin.

5. A method as claimed in claim 4 wherein said ionomer comprises zinc and sodium base ionomer.

6. A method as claimed in claim 1 further including, after the plating step, a step of bonding an intermediate primer layer to said plated surfaces, and thereafter, foam injection molding the ionomer to said primer layer.

7. A method as claimed in claim 6 wherein said primer layer comprises carboxylic acid copolymer of ethylene.

8. A method as claimed in claim I further comprising an initial step of injection molding an article from said plastic.

9. A method as claimed in claim 1 wherein said metal is selected from zinc, tin, lead, chromium, nickel, copper and mixtures thereof.

10. A method of bonding zinc and sodium based ethylene ionomer to plastic, said method comprising:
   injection molding a plastic article from ABS platable grade plastic resin,
   plating a surface of the plastic article by electrolytic deposition of metal in an electrolytic bath, and
   injection molding said zinc and sodium based ethylene ionomer onto the plated surface.

11. A composite article comprising:
   a shell of metal-platable grade plastic resin having a layer of metal plated to surfaces thereof, and
   a core of foamed ethylene ionomer injection molded to said layer of metal over first portions thereof with second portions of said layer of metal comprising decorative exterior surfaces of the article.

12. An article as claimed in claim 11, wherein said shell is injected molded from said plastic resin.

13. An article as claimed in claim 12, wherein said core has coupling means embedded therein for coupling the article to a support.

14. A decorative, structural automotive bumper comprising:
   a shell of metal-platable grade plastic resin, said shell having exterior surfaces and interior surfaces,
   said exterior and interior surfaces plated with a decorative layer of metal, and
   a core of substantially rigid but resilient foamed ethylene ionomer bonded to said interior surfaces,
   wherein said bumper is made by a process comprising:
   plating said exterior and interior surfaces with said metal layer and then foam injection molding the core to the metal layer over the interior surfaces.

15. A bumper as claimed in claim 14 wherein said shell comprises an injection molded shell.

16. A bumper as claimed in claim 15 wherein said resin comprises ABS plastic, said ionomer comprises zinc and sodium based ethylene ionomers and said metal is selected from the group comprising chromium, nickel and copper and mixtures thereof and said metal is plated onto surfaces of said shell by an electrolytic deposition process.

17. A bumper as claimed in claim 14 wherein a primer layer is disposed intermediate the interior surfaces and said ionomer to bond them together.

18. An article as claimed in claim 11 wherein a primer layer is disposed intermediate said first portions and said core to bind said layer of metal to the core.

* * * * *